Jan. 18, 1966 A. F. SCHOTT 3,229,386
TOOLS FOR TEACHING GEOMETRY
Filed Jan. 14, 1965 6 Sheets-Sheet 1

INVENTOR.
ANDREW F. SCHOTT
BY
Wheeler Wheeler and Wheeler
ATTORNEYS.

Jan. 18, 1966  A. F. SCHOTT  3,229,386
TOOLS FOR TEACHING GEOMETRY
Filed Jan. 14, 1965  6 Sheets-Sheet 3

INVENTOR.
ANDREW F. SCHOTT
BY
Wheeler Wheeler and Wheeler
ATTORNEYS.

Jan. 18, 1966  A. F. SCHOTT  3,229,386
TOOLS FOR TEACHING GEOMETRY
Filed Jan. 14, 1965  6 Sheets-Sheet 4

INVENTOR.
ANDREW F. SCHOTT
BY
Wheeler Wheeler and Wheeler
ATTORNEYS.

INVENTOR.
ANDREW F. SCHOTT

Jan. 18, 1966    A. F. SCHOTT    3,229,386
TOOLS FOR TEACHING GEOMETRY
Filed Jan. 14, 1965    6 Sheets-Sheet 6

INVENTOR.
ANDREW F. SCHOTT

United States Patent Office 3,229,386
Patented Jan. 18, 1966

3,229,386
TOOLS FOR TEACHING GEOMETRY
Andrew F. Schott, Rte. 1, Green Lake, Wis.
Filed Jan. 14, 1965, Ser. No. 426,708
23 Claims. (Cl. 35—34)

This is a continuation-in-part of applicant's copending application, Serial No. 203,504, filed June 19, 1962, now abandoned.

This invention relates to demonstrative equipment for metric or nonmetric geometric learning or teaching processes.

More particularly stated, this invention relates to equipment in the form of assembleable and disassembleable elements such as frames, posts, and flat plate or card-like figures whereby to provide means for constructing and demonstrating the many linear, vector, geometric and topological characteristics of plane, hollow or solid forms or objects.

The invention relates to geometric frames and other elements designed to represent the skeletal outline of geometric figures so that the frames, as bases of such skeletal figures, are connected by interconnecting members using types of joints which make the connecting member interchangeable when used in conjunction with various types of geometric bases. Thus construction is possible with respect to different skeletal types exemplifying geometric solids used in the teaching of various types of solid, metric and nonmetric geometries and topologies.

The bases and connecting member for said skeletal frames are so constructed that plane faces of the figures can be affixed thereto to exemplify various types of solid geometric figures and also to indicate the planes and intersection of planes involved in the geometric forms. Various retainers and clips are provided integral with the skeletal frames and connecting members to hold the faces of the forms whereby to complete the form in exact dimensions. These clips and retainers are so arranged as to be without interference with, or limitation upon the use of the face materials as they apply to the dimensions needed to complete the exemplification of the solid figure.

The interchangeability of the connecting members and any selected frame makes it possible, in accord with this invention, to construct not only regular but also irregular geometric figures which present unusual problems in metric and nonmetric geometries topology.

Reference has been made to the faces or surfaces used in accord with this invention to complete exemplifications of geometric forms. These surfaces or faces provide writing surfaces upon which lines and informational subject matter coordinate with the instructional material embodied in the skeletal or exemplified solid figure can be inscribed. Some surfaces of some face materials are provided with a grid of regular scribe lines for assistance in measurement concepts and for assistance in determination by a user as to congruence or non-congruence of somewhat unrelated face material for comparative purposes.

Although the disclosed hereof is detailed and exact to enable those skilled in the art to practice the invention, the physical embodiments herein disclosed merely exemplify the invention which may be embodied in other specific structure. The scope of the invention is defined in the claims appended hereto.

Frames, posts, and surface elements for assembly in various geometric forms are shown in the drawings. They are made of plastic and are designed for accurate and rapid production necessary to furnish the elementary school pupil with means for manual and visual acquaintance with linear, vector, plane and three dimensional or solid geometric forms.

Figure 1:
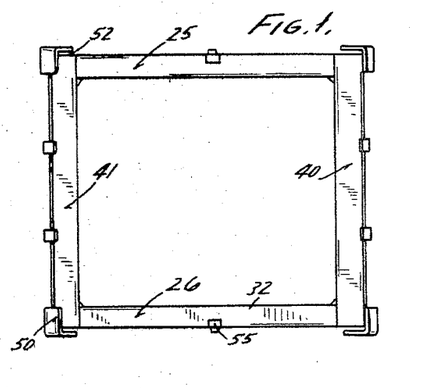
FIGURE 1 is an end elevation of frames and posts assembled to form the skeleton of a rectangular solid such as a cube.
Figure 2:
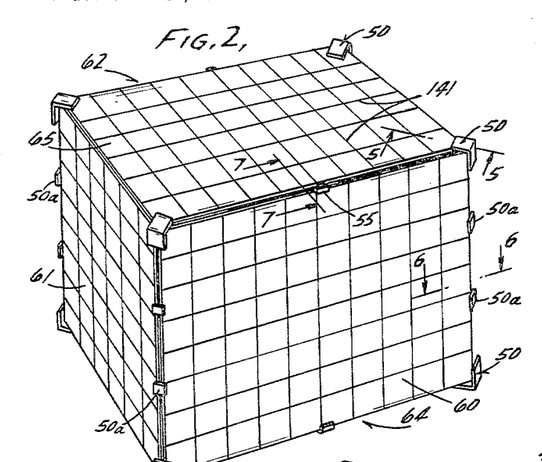
FIGURE 2 is a perspective view of the cube of FIGURE 1 but with flat plate or card-like figures completing the faces of the rectangular solid or cube.
Figure 3:
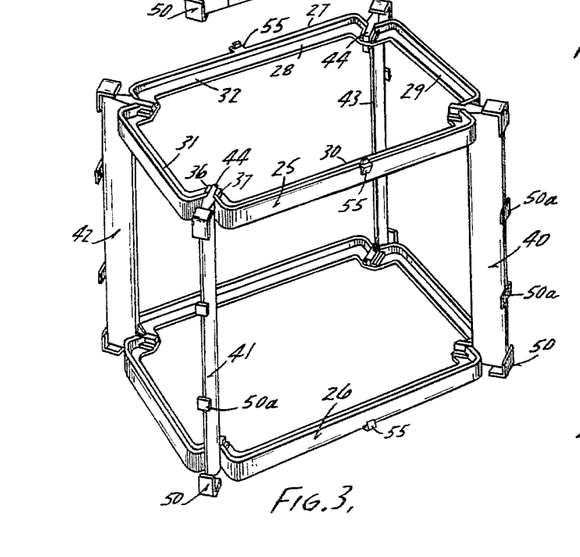
FIGURE 3 is a perspective skeletal view of the rectangular solid or cube of FIGURE 2 with the plate-like figures removed to show some of the detailed structure of the frames and posts.
Figure 4:
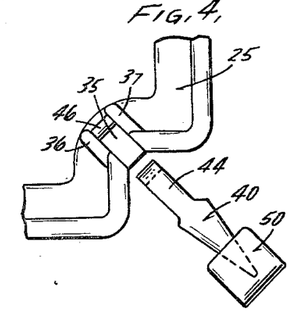
FIGURE 4 is an enlarged detail showing the interengageable portions of a frame and post in position for movement into interlocking engagement.
Figure 5:
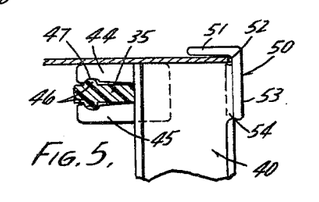
FIGURE 5 is a section on line 5—5 of FIGURE 2.
Figure 6:
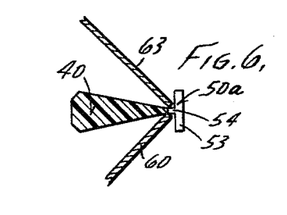
FIGURE 6 is a section on line 6—6 of FIGURE 2.
Figure 7:
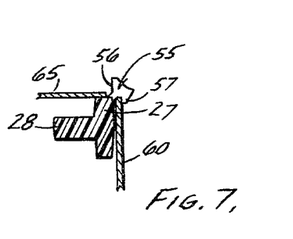
FIGURE 7 is a section on line 7—7 of FIGURE 2.

Referring first to the simpler form of a cube, as seen in FIGURES 1 to 7 inclusive, it will be seen that I have provided end frames 25 and 26 respectively. These are T-shaped in cross section (see FIGURE 7) to provide a strong outer web 27 and an inwardly extending stiffener or brace 28. At the corners of the frame, the same T cross section is preserved; but instead of a simple miter configuration, the respective ends of the equal, straight side stretchers 29, 30, 31 and 32 are inturned as shown in FIGURE 4. There these inturned ends are sufficiently spaced apart to provide room for a spanner 35 integral with spaced parallel cheek plates 36 and 37. At each corner, these cheek plates are integral with the webs of the stretchers and with a spanner to provide a saddle for reception of connector elements of posts now to be described.

At each corner of the cube and comprising posts 40, 41, 42 and 43 are the members which, assembled with frames 25 and 26, complete the larger structural parts of the skeletal cube of FIGURE 3. The posts are wedge shaped in cross section and are provided at their ends with connector jaws 44 and 45 directed inwardly, at right angles to the longitudinal axis of the post. As seen in FIGURE 4, the jaws extend laterally of the thick edge of the wedge in such relation to the end of the post that when the jaws engage the spanner 35 between them, the end of the post is flush with the outermost edge of web 27 of the frame.

Although the spanners 35 generally have two broad flat surfaces, each flat surface has a rib 46 so positioned as to be received into a groove 47 in the jaw in which is to bear against that surface. This provides a detent mechanism to tend to hold the assembled jaw and spanner combination, since there is inherent resiliency in the plastic material of which the jaws are made. It will be seen that chamfered margins of the jaw portions of the posts abut the chamfered cheeks for accuracy while the ribs 46 are not quite fully received into jaw grooves.

Secured to the "sharp" edge of the wedge shape of the post, at the ends thereof, are plate retainers 50, best seen in FIGURES 3 to 6 inclusive. It will be noted that each retainer comprises an oblong plastic piece bent to L-shape and so bonded integrally to the sharp edge of the post as to position one leg 51 of the L retainer in spaced relation over the end of the post (see gap 52) and the other leg 53 of the L is so angularly outstanding from the board face of the particular post that it may act as a retainer for the margin of a plate comprising a surface of the geometric figure of which the post is an assembled part.

The retainer leg 53 is so positioned relative to jaws 44 and 45 when an assembly operation is carried on involving the thrusting of the jaws into engagement with a spanner 35, the pressure required for the assembly is applied to the leg 53 and the jaws sliding in over the flat portions and finally over the rib 46 until the groove 47 receives the rib in detent relationship. Then when a disassembly operation is initiated, the leg 53 of the retainer, firmly welded or bonded to the post, is of assistance as a handle to "work" the jaws to resiliently free the rib from the groove as will be readily understood.

It will further be noted that the molded material or "weld" between the retainer 50 and the sharp edge of its post is provided with an extension or filet 54 for reasons described below.

In addition to the retainers 50, the frames and posts are provided at spaced points along their outwardly disposed margins, as seen in FIGURES 2 and 3, with clips 55. These are so shaped as to furnish margin abutments 56 and an overhanging lip 57 to position and hold the extreme margin of six plate-like surface elements 60, 61, 62, 63, 64 or 65 of the cube shown in FIGURE 2. The plates are made of any suitable sheet material such as resilient cardboard or plastic subject to distortion from true planar configuration sufficiently to permit the user to slide the margins under the retainers 50 and under lips 57 of the clips 55.

Figure 8:
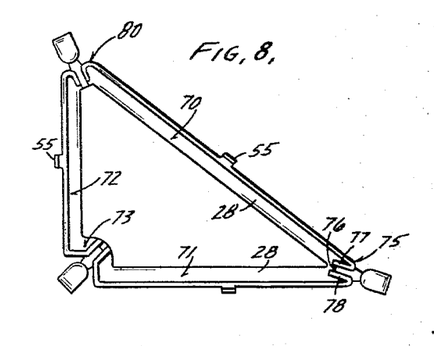
FIGURE 8 is an end view of the assembled frames and posts of an acute scalene triangular right prism.

Certain features respecting the frames and posts of the skeletal structure of other geometric forms than cubes are shown in FIGURES 8 to 11 and 20. In FIGURE 8, an end frame of a right triangularly polygonal form is shown. Here stretchers 70, 71 and 72 have the same T-shaped cross section as that shown in the frame of the cube, but with the exception of the corner 73, the corners are differently constructed. Web 28 of the stretchers 70 and 71 is substantially continuous at corner 75 so as to provide spanner 76, and cheeks 77 and 78 comprise continuations of end portions of web 27 which, for this purpose, are bifurcated and turned inward as shown in FIGURE 8. The same is true of corner 80, the angle being only slightly different from that at 75.

Figure 9:
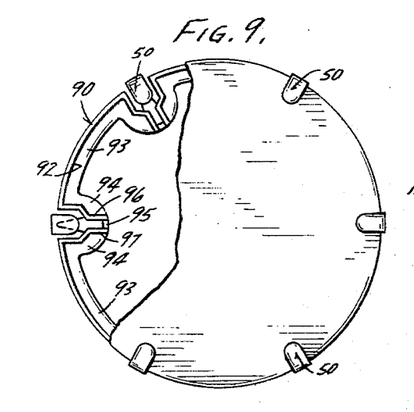
FIGURE 9 is an end elevation of an end faced hollow cylindrical figure, the end face being broken away to show portions of cylindrically arranged skeletal members.
Figure 10:
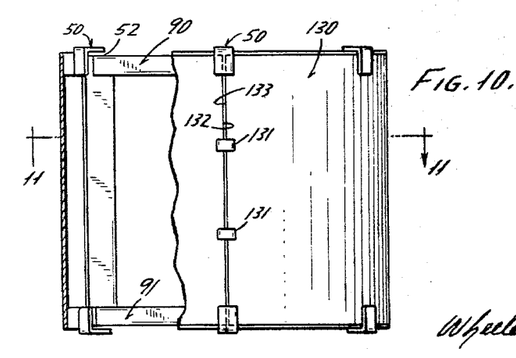
FIGURE 10 is a side elevation of a cylindrical figure such as that shown in FIGURE 9 but showing a side wall face in position on the cylindrically arranged skeletal frame work, a portion of the face being broken away to show the assembled relation of posts to end frames.
Figure 11:
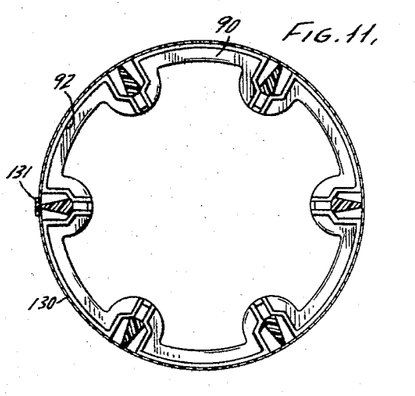
FIGURE 11 is a section on line 11—11 of FIGURE 10 but showing a complete tubular face.

Special provision skeletally is provided respecting a cylindrical geometric form as shown in FIGURES 9, 10 and 11. Here the end frames 90 and 91 are generally circular, but the saddles for posts are so inset from an outer circular web 92 (corresponding to web 27, FIGURE 7) that a web 93 (corresponding in function to web 28) is convoluted at 94, inwardly of the cylindrical figure. Here, too, as at 76 (see FIGURE 8) the extended web 93, at 95 functions as a spanner for reception between the jaws of a post, and a set of cheeks 96–97 at each side of the spanner 95. Note the shape of these cheeks which act as a guide when the jaws of a post are to be projected in upon a spanner in an assembly operation.

FIGURES 12 to 16 inclusive relate to the invention as embodied in a parallelepipedon 100, the end frames 101 and 102 of which are parallelograms, but with each saddle 105, 106, 107 or 108 differently made and differently angularly disposed, since the side stretchers are cocked relative to the axis of the post as shown in the drawings.

Figures 12, 13, 14, 15, 16:
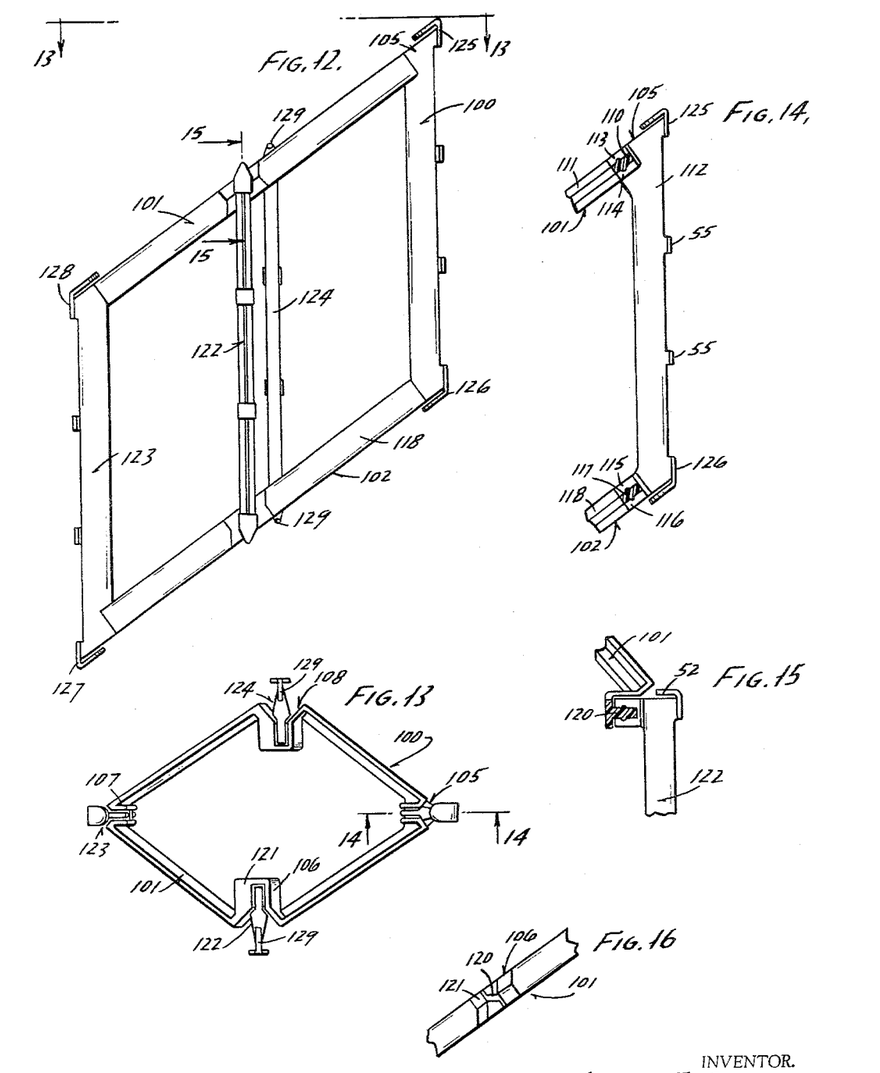
FIGURE 12 is a side elevation of frames and posts assembled in the form of a parallelepiped.
FIGURE 13 is a plan of the assembly in FIGURE 12, the view being from line 13—13 of FIGURE 12.
FIGURE 14 is a section on line 14—14 of FIGURE 13.
FIGURE 15 is a section on line 15—15 of FIGURE 12.
FIGURE 16 is a fragmentary detail in side elevation of a portion of an end frame of the parallelepiped of FIGURE 12 showing the saddle for reception and interengagement with connector elements of a post.

For instance, the saddle at 105 has a spanner 110, parallel to stretcher 111, at such an angle respecting the axis of post 112 that jaws 113 and 114 must be disposed as shown in FIGURE 14. At a similar angle respecting the axis of post 112 are the jaws 115 and 116 which engage spanner 117 forming part of stretcher 118 of frame 102, it being clear from FIGURE 14 that the included angle is acute between the axes of 111 and 112 and the included angle between 112 and 118 is obtuse.

To provide a post and spanner relationship at saddle 106, the construction shown in FIGURES 13 and 16 includes spanner 120 extending between specially angularly disposed cheeks of block 121. When thus formed, the post 122, except as to length and retainers, is the same post 40 and interengages readily with the spanner 120. Then as will now be clear, a post at 123, identical with post 112, but reversed end for end, engages a saddle at angle 107 and corresponding saddle in frame 102.

At 124, a post identical with post 122 completes the skeletal larger members of the parallelepipedon 100. The angularity of retainers at 125, 126, 127 and 128 respectively, will be observed (see FIGURE 12), and attention is now called to the retainers at the ends of posts 122 and 124. The legs overlying the ends of these posts have limited lateral extent as shown at 129 for reasons that will be apparent in connection with the description of the card-like faces which are to be applied to the skeletal forms.

Assuming that a skeletal cube has been assembled as shown in FIGURE 3 and used to demonstrate the constructive characteristics of three dimensional cubic concepts, the cube as a solid or as a hollow form is demonstrated by assembly of plates 60 to 65 inclusive against the "outside" edges of posts and frames as shown in FIGURE 2. Here the retainers 50 and clips 55 as described above are so positioned as to receive the edges of the respective plates and hold them accurately whereby to complete the faces of the cube. Similarly the triangular end faces and oblong faces of the right triangular polygon (FIGURE 8) or the parallelogram plates to face the parallelepiped of FIGURES 12 and 13 are received and held against the outside of the skeletal frames of those respective forms.

As to the cylindrical face 130 of the geometric form re FIGURES 9, 10 and 11, only one oblong "plate" or sheet of facing material is required, and it will be seen that the one sheet 130 wrapped around the skeletal frame posts needs only the retainers 50 shaped as at 50a at the ends of the posts plus a special set of clips 131 on one post and which overlie each of the ends 132 and 133 of the sheet (see FIGURE 10) to position the sheet. This is true because of the resilient nature of cardboard or plastic of which a face is made. It naturally assumes a cylindrical form which is easily retained. It may be noted that a "lacing" of the sheet 130 under the successive retainers, around the end frames 90 and 91 make unnecessary any deformation of the face in compound curves, as will be readily understood.

Figures 17, 18, 19, 20:
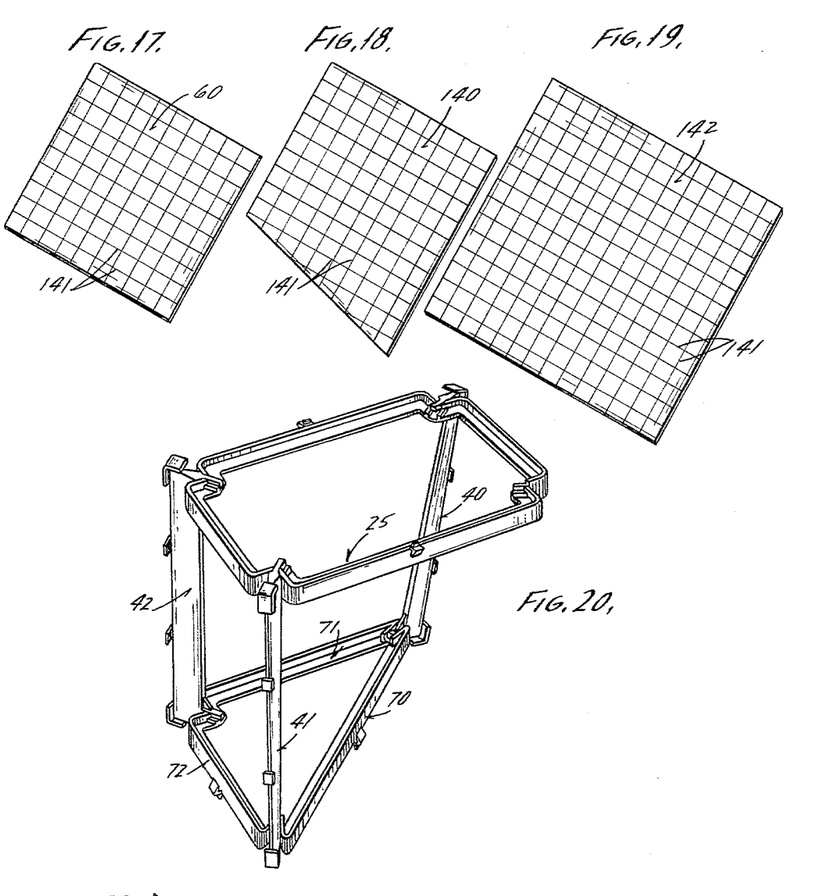
FIGURE 17 is a perspective view in exemplification of a plate.
FIGURE 18 is a perspective view of a plate noncongruent with respect to the plate of FIGURE 17 in respect to angularity of margins thereof.
FIGURE 19 is a view in perspective of a plate not congruent respecting the plate of FIGURE 17 and the plate shown in FIGURE 18, the incongruency of the plate in FIGURE 19 being in respect to size or proportion relative to the plate of FIGURE 17.
FIGURE 20 is a perspective of a skeletal geometric figure made up of a rectangular frame and a triangular frame with posts which are identical, but are distorted; thus showing the resiliency of the polystyrene or rubber-like material of which the skeletal forms are made.

In FIGURES 17, 18 and 19, I have shown the relationship of a specimen of the six equal face plates 60 to 65 inclusive for an accurate cube, plus two plates 140 and 142 of different and differing dimensions and areas. The differences are emphasized by a grid of graph lines 141. These assist in demonstration of congruent and noncongruent elements in the hands of a teacher and student, since the inapplicability of the plates 140 or 142 to the frames and posts of FIGURES 2 and 3 will be immediately apparent. Similar status of incongruency of plates or frames respecting each other, or of certain forms of plates respecting certain frame forms may be provided in keeping with this invention, for instance in the field of the triangular, circular and parallelogram forms of FIGURES 8, 9 or 12.

These plates, to a degree, are stretchable as well as distortable.

The two frames, for instance those of FIGURE 3, intuitively suggest plane surfaces intersected by four line segments. This gives the child the intuitive knowledge of a plane figure, a quadrilateral. As soon as he fits the four posts, he has constructed the outlines of six planes which immediately intuitively suggest the intersection planes—which are not only available in the form of plates—but when used, provide an exemplification of a solid.

The markings on the plates are to be used by the students to note the differences or likenesses between them and to categorize such likenesses or differences, also to mark and define other characteristics of the cubes or other figures.

The other faces, opposite the grid graphs are available on the plates to mark identification of the one to six plates and the students own analysis of problems related thereto.

Figure 21:
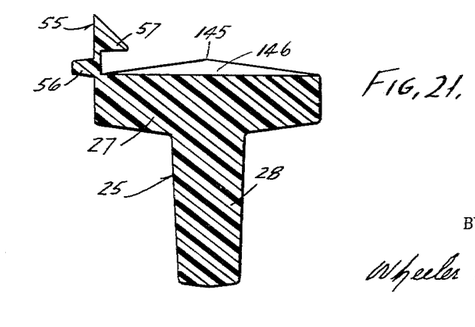
FIGURE 21 is a section to show the "draw" on a frame at a clip location.

It will be noted, as shown clearly in FIGURE 21, that a frame cross section is so shaped as to provide "draw" for the dies of the plastic mold which is used to make it, and the center line marks the thickest section for the dies coming in from the right and left as seen at 145. However, a channel is provide across from right to left as shown at 146 so that the die approaching from the right can extend clear across the frame to form the clip; and the face plate which is to overlie the frame at draw center line 145 will be springy and will tend to be retained marginally by the lip 57.

Figure 29:
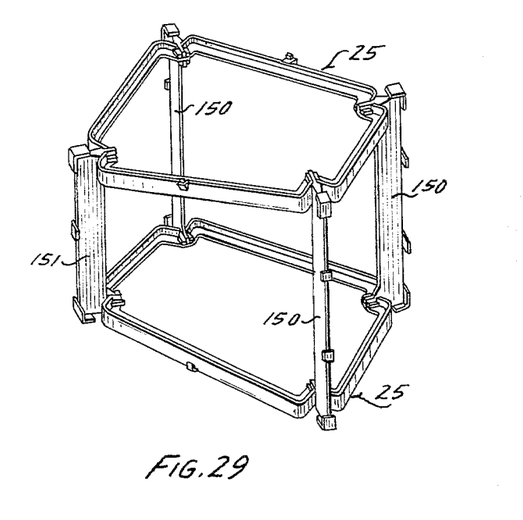
FIGURE 29 is a perspective view of a topological solid geometric figure in which one of the posts is shorter than the other posts to warp the figure.

FIGURE 29 illustrates a topological solid geometric form in which the two end frames 25, both of which are rectangular in plan, are interconnected by three posts 150 of equal length, and another post 151 which is somewhat shorter than the posts 150. Accordingly, the skeletal solid geometric form is topological in that the opposite end frames 25 are somewhat warped out of parallelism or distorted. Topological figures of this type can be produced in any of the various shapes and sizes of solid geometric forms simply by making one or more legs shorter or longer than the other legs. The surface plates designed to fit a nontopological form such as shown in FIGURE 2 will conform to only some of the faces of the topological figures shown in FIGURE 29, thus illustrating the topological nature of such figures.

FIGURES 22 through 28 show a modified embodiment of frames and posts. In this embodiment the end frames 152 comprise side stretchers 153 and end stretchers 154 which meet at corners 155 to form a plane geometric figure, such as the rectangle shown in the drawings. As in the previously described embodiment, the parts desirably molded of plastic. The specific cross section of the stretchers is not critical, although in practice a desirable cross section is somewhat channel-shaped, as shown in FIGURE 30 in which there are edge flanges 156, 157 interconnecting a flat web 158.

Figures 24, 25:
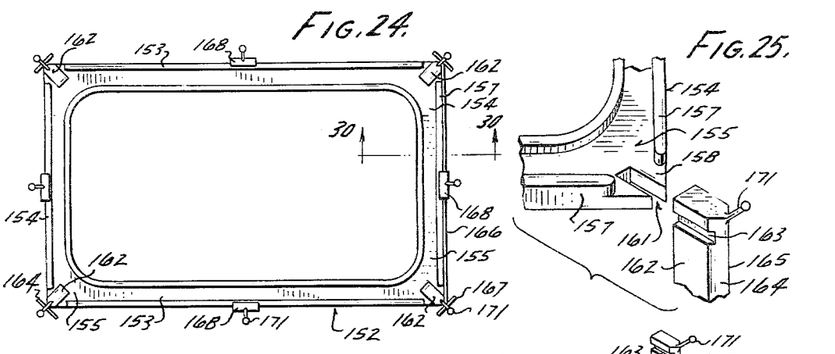
FIGURE 24 is a top view of the skeleton rectangular solid of FIGURE 22.
FIGURE 25 is a fragmentary detail perspective view in spaced apart relationship of the corner connection of an end frame and a post of the embodiment of FIGURE 22 of the invention.

At their corners 155, the end frames 152 have their outer flange 157 relieved and the web 158 is provided with an obliquely inwardly projecting slot 161, as is best shown in FIGURE 25.

A pair of end frames 152 are interconnected by posts 162. Near their ends, the sides of the posts 162 have paired grooves 163 which receive the edges or tongues of the web 158 which are exposed by the slots 161, when the post is coupled to the frame corner 155. Accordingly, the slotted corner of an end frame and the grooved end of the post constitute a detent for releasably interconnecting a post with the frame.

Posts 162 have their outer edges beveled at 164. The bevels 164 terminates in a sharp edge 165. The beveled faces 164 of the posts and the sharp edge 165 thereof are coplanar with the outer edges of the end frames 152 when the frame and posts are assembled as shown in FIGURES 22–24 and 28. Accordingly, when a surface plate 166 is assembled thereto, it will receive marginal support completely around its periphery from the coplanar edges of the end frames and the posts.

As in the previously described embodiment, the end frames 152 constitute complete plane geometric frames for top and bottom faces of the skeletal solid geometric form. The side and end faces also comprise plane geometric figures defined in part by the stretchers of the end frames and in part by the posts. Moreover, the end frames may have any geometric shape, such as a triangle, square, etc.

Figures 22, 23:
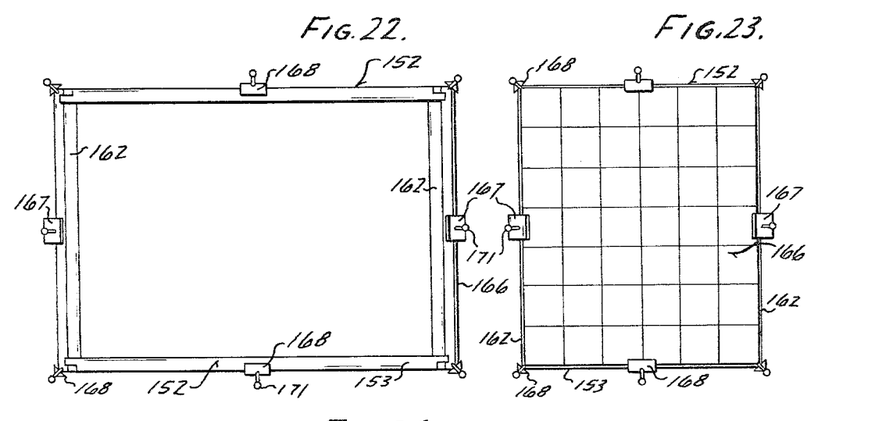
FIGURE 22 is an elevation of frames and posts assembled to form the skeleton of a rectangular solid such as a cube in a modified embodiment of the invention.
FIGURE 23 is an end view of the skeleton rectangular solid of FIGURE 22, to which an end surface plate has been applied.

As in the embodiments of FIGURES 1 through 21, the posts 162 are provided with clips 167 and the end frames 152 are provided with clips 168 behind which the surface plates 166 are received to hold the plates onto the skelton form. In this embodiment of the invention, one clip 167 is provded midway of the length of each post and the end frames 152 are provided with a clip at the midpoint at each of the side and end stretchers thereof. This is sufficient to hold the plates 166 onto the frame, as shown in FIGURE 23.

In this embodiment, as well as in the embodiments of FIGURES 1–21, the edges of the plates 166 will meet at the corners of the skeletal frame to conceal the frame when each side thereof is provided with a surface plate. The only portions of the frame that will be visible are the clips 167 and the knob-like protrusions 171.

Figures 26, 30:
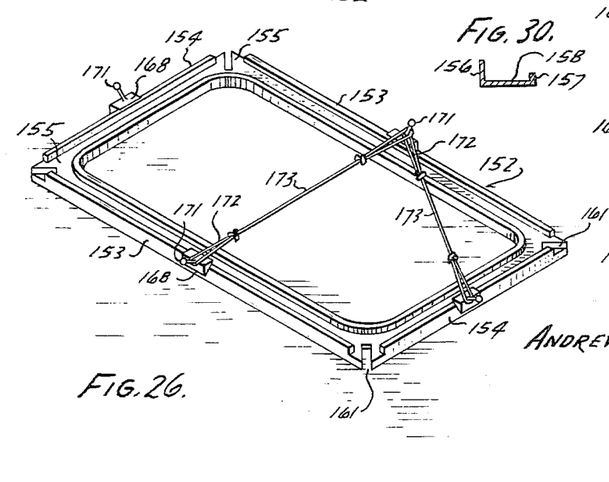
FIGURE 26 is a perspective view of one of the end frames of the embodiment of the invention shown in FIGURE 22, to which rubberbands or the like have been connected between post-like anchors formed on the frame, thus to create a new plane geometric form defined by the end frame.
FIGURE 30 is a cross section taken along the line 30—30 of FIGURE 24.
Figure 27:
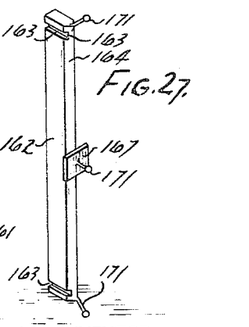
FIGURE 27 is a perspective view of one of the posts in the embodiment of FIGURE 22.
Figure 28:
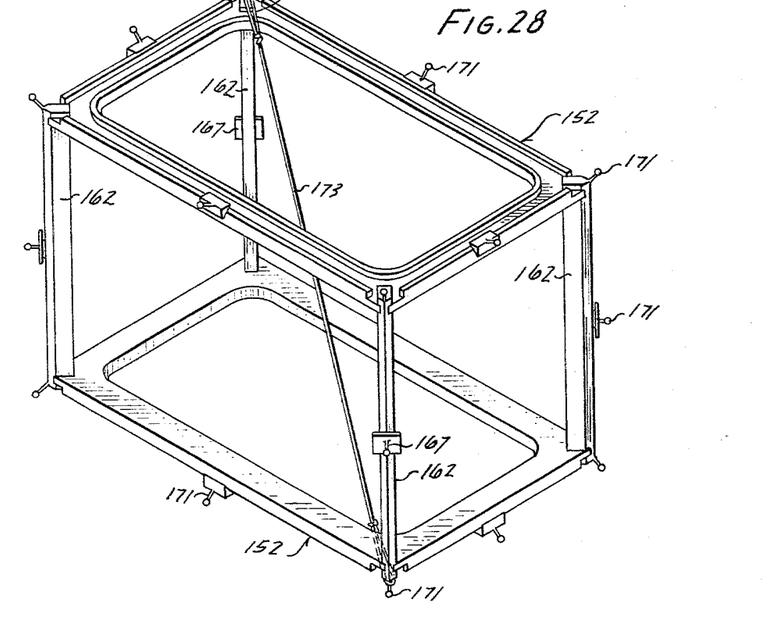
FIGURE 28 is a perspective view of the skeleton cube of FIGURE 22, a rubberband or like line being connected between projecting posts thereon to truncate the solid geometric form defined tby the frames and posts.

Knob-like protrusions 171 are desirably molded integrally with the edge clips 167, 168. They are also provided at the ends of the posts 162 and project obliquely outwardly therefrom. These provide anchors for the loops 172 of the rubberbands 173 or like lines, as shown in FIGURES 26 and 28. The purpose of the bands or lines 173 is to truncate the various geometric forms to which they are applied, thus to give a student assistance in visualizing the shape of the geometric forms as truncated by the bands or lines 173. Inasmuch as the knob-like anchors 171 will be disposed at several different places on any figure, the lines 173 may be used to truncate the forms in a variety of shapes and sizes, all useful in the teaching of geometry.

I prefer to use rubberbands for lines 173 so that one band is adapted to stretch to fit a variety of forms and to keep it taut in the span between the knob-like projections 171 to which its end loops are attached.

In all embodiments hereof the parts are molded in plastic. Stretchers and corners of the respective end frames are integrally molded in one-piece, thus to serve as plane geometric figures as well as components of solid geometric figures. The posts are separately molded. The detents between the posts and frame corners, the plate retaining clips and the knobs are integrally molded with their respective frames and posts, thus to facilitate fabrictaion and simplify assembly by the student, inasmuch as all component parts are integral with the frames or posts. The posts are interchangeable as between various figures.

I claim:

1. A geometric form assembleable demonstration set comprising:
    a pair of spaced apart one-piece end frames each comprising integrally molded plastic side stretchers and corners at the intersection of the side stretchers to form a plane geometric figure,
    separately molded plastic posts transverse to said end frames,
    releasable detents comprising parts integrally molded in said posts and frame corners and interconnecting said posts to the corners of the end frames,
    said posts and end frames together forming a skeletal form for a solid geometric figure,
    said posts and the stretchers of the end frames having coplanar outside edges which together define a side frame,
    and a surface plate applicable to said side frame in contact with the outside edges of the posts and stretchers of the end frames.

2. The set of claim 1 in which said detent parts comprise interengaging tongues and grooves on the posts and frame corners.

3. The set of claim 1 in which one of the posts is shorter than another of said posts to form a topological skeletal frame.

4. The set of claim 1 in which said plate has a scribable surface and scribed grid marks thereon exemplifying measured distances along said surface.

5. The set of claim 1 in which the outside edges of the posts and frames respectively have plastic clips integrally molded therewith for retaining the surface plate thereagainst.

6. The set of claim 5 in which the plate is flexible to yield laterally of its plane in the course of engagement with said clips.

7. The set of claim 1 in which said end frames are provided with integrally molded projecting knob-like plastic anchors.

8. The set of claim 1 in which said posts are provided with integrally molded projecting knob-like plastic anchors.

9. The set of claim 1 in which the releasable detent parts comprise:
    obliquely inwardly extending slots in the corners of the end frames,
    paired grooves formed in the sides of the posts to receive corner edges exposed by said slots.

10. The set of claim 1 in which corresponding corners of the end frames are turned inwardly to provide recesses in which a post is received to dispose the outer edge of the post flush with the outer edges of the end frame stretchers.

11. A geometric form assembleable demonstration set comprising:
    a pair of one-piece end frames each comprising integrally molded plastic straight side stretchers having outside edges and corners interconnecting the straight side stretchers in intersecting angular relation to form a plane geometric figure,
    separately molded plastic posts transverse to said end frame, said posts having outside edges,
    releasable detents comprising parts integrally molded in said posts and frame corners and interconnecting said posts to the corners of the end frames,
    said posts and end frames together forming a skeletal form for a solid geometric figure,
    the outside edges of the posts being in coplanar relation with the outside edges of the side stretchers of the end frames,
    the outside edges of the posts and straight side stretchers of the end frames defining a plane geometric side frame.

12. The set of claim 11 in which the outside edges of the posts and frames respectively have plastic clips integrally molded therewith for retaining a surface plate thereagainst.

13. A geometric form assembleable demonstration set comprising:
    a pair of spaced apart one-piece end frames each comprising integrally molded plastic side stretchers and inturned corners interconnecting the side stretchers to form a plane geometric figure, said inturned corners providing post receiving recesses,
    separately molded plastic posts transverse to said end frames,
    releasable detents comprising parts integrally molded in said posts and frame corners and interconnecting said posts to the inturned corners of the end frames,
    said posts and end frames together forming a skeletal form for a solid geometric figure,
    said posts and the stretchers of the end frames having coplanar outside edges which together define a side frame,
    and a surface plate applicable to said side frame in contact with the outside edges of the posts and stretchers of the end frames.

14. A geometric form assembleable demonstration set comprising:
    a pair of laterally spaced one-piece plastic plane geometric figure end frames having integrally molded straight sides and corners at which said sides meet,
    separately molded plastic posts transverse to said end frames,
    said posts and end frames having outside edges,
    detent means integrally molded is said posts and corners and interconnecting said posts with the corners of said end frames to dispose the outside edges of the posts and the outside edges of the end frames in coplanar relation,
    said posts and end frames together constituting a skeletal form for a solid geometric figure having side frames made up of the outside edges of the posts and end frames for reception of surface plates thereagainst,
    the outside edges of the posts and frames respectively having plastic tips integrally molded therewith for retaining a surface plate thereagainst.

15. A geometric form assembleable demonstration set comprising a pair of one-piece saddle equipped plastic frames and jaw equipped plastic posts interengageable to complete an exemplification of a skeletal geometric form; and surface plates removably receivable against said skeletal figure to complete an exemplication of a solid geometric figure; said posts and said frames having integrally molded spaced plastic retainers and spaced plastic clips, respectively, positioned to engage margins of said plates, said plates being congruent with the geometric form defined by said frames and posts to be demonstratably applicable thereto and additional plates which are incongruent with such form to be demonstrably inapplicable thereto.

16. A geometric form assembleable demonstration set comprising:
a pair of spaced apart one-piece end frames comprising integrally molded plastic side stretchers and corners at the intersection of the side stretchers to form plane geometric figures,
separately molded plastic posts transverse to said end frames,
releasable detents comprising parts integrally molded in said posts and frame corners and interconnecting said posts to the corners of the end frames,
said posts and end frames together forming a skeletal form for a solid geometric figure,
said posts and the stretchers of the end frames having coplanar outside edges which together define side frames,
and surface plates applicable to said side frames in contact with the outside edges of the posts and stretchers of the end frames,
said surface plates having edges which intersect to form corners of a solid geometric figure.

17. The set of claim 16 in which the outside edges of the posts and frames respectively have plastic clips integrally molded therewith for retaining the surface plates thereagainst.

18. Assembleable and disassembleable members to complete a geometric form, said members comprising frames and posts; said frames each comprising integrally an outside web and an inwardly extending web relative to the geometric form, said outside web being interrupted at spaced points to leave an exposed portion of the inwardly extending web to comprise a spanner; cheeks normal to the spanner and positioned against the outside web in position to provide, with said spanner, a saddle; said posts comprising elongated members interconnectible between certain saddles of spaced frames and including jaws angularly positioned with respect to the axis of the post whereby to engage said spanner.

19. The members of claim 18 wherein the jaws of the post extend angularly in one direction from the axis of the post, and the post is provided with a pad shaped retainer opposite said jaws and aligned therewith, and a surface plate receivable against said outside web and positionable with its margin under said pad shaped retainer.

20. The members of claim 18 wherein two frames are each circular, in general, whereby to comprise end frames of a cylindrical form and the inwardly directed webs are convoluted at spaced points to provide saddles inset respecting the outer dimensions of said cylindrical form, said posts having their respective ends flush with respective end frame surface and having retainers overlying the ends of the posts whereby to be disposed in position to marginally receive an end plate; an end plate receivable externally of the assembled form against the frame and against the ends of the posts with the margins of the end plate under a retainer; one of said posts having spaced clips provided with abutment and lip surfaces to receive the end margins of a tubularly encompassing surface plate; and a flat, resilient, rectangular surface plate assembleable about posts respectively extending between opposite pairs of said saddles in said circular frames.

21. A geometric form assembleable set comprising a plurality of one-piece plastic plane geometric frames, certain of said frames being incongruent with others of said frames, posts shaped to provide connecting members between spaced frames, detents for interconnecting said posts and frames in solid geometric forms, said posts and frames having flexible distortable portions whereby the interconnection of posts and incongruent spaced frames creates distorted odd shaped topologic solid geometric forms.

22. Assembleable and disassembleable members to complete an exemplification of a geometric solid, said members including frames, posts, and plates; said frames each comprising an integral outline plane form including spaced saddles; said posts comprising elongated members wedge shaped in cross section with jaws angularly disposed adjacent the ends of said posts and directed opposite to the sharp edge of the wedge; said plates having margins receivable in coincidence with said sharp wedge edge; and lipped clips arranged along said wedge edge for engagement with the plate margins whereby to hold a plate against posts and frame to complete said exemplification.

23. In a device of the character described, spaced planiform frames each having a plurality of saddles including a spanner; posts wedge-shaped in cross section whereby to provide oppositely facing edges, one of which is sharp, and the other is broad, a pair of jaws extending from said broad edge in a direction to engage a frame spanner whereby to dispose the sharp edge oppositely of said spanner in position to define a margin of a three dimensional geometric form corresponding to the planiform of said frames.

References Cited by the Examiner
UNITED STATES PATENTS

| | | | |
|---|---|---|---|
| 501,675 | 7/1893 | Collins | 35—34 X |
| 646,661 | 4/1900 | Hanstein | 35—34 X |
| 1,796,024 | 3/1931 | Hohler | 220—80 X |
| 2,388,297 | 11/1945 | Slaughter | 189—76 |
| 2,751,109 | 6/1956 | Moore | 220—80 |
| 2,815,598 | 12/1957 | Gazan | 40—209 |
| 2,956,705 | 10/1960 | Clingman | 189—76 |
| 2,977,688 | 4/1961 | Redey | 35—34 X |
| 3,120,078 | 2/1964 | Bessinger | 46—31 |

EUGENE R. CAPOZIO, *Primary Examiner.*

LAWRENCE CHARLES, WILLIAM GRIEB, *Assistant Examiners.*